April 16, 1968 J. L. SVEC 3,378,234
HOMOGENIZER
Filed Nov. 25, 1966 3 Sheets-Sheet 3

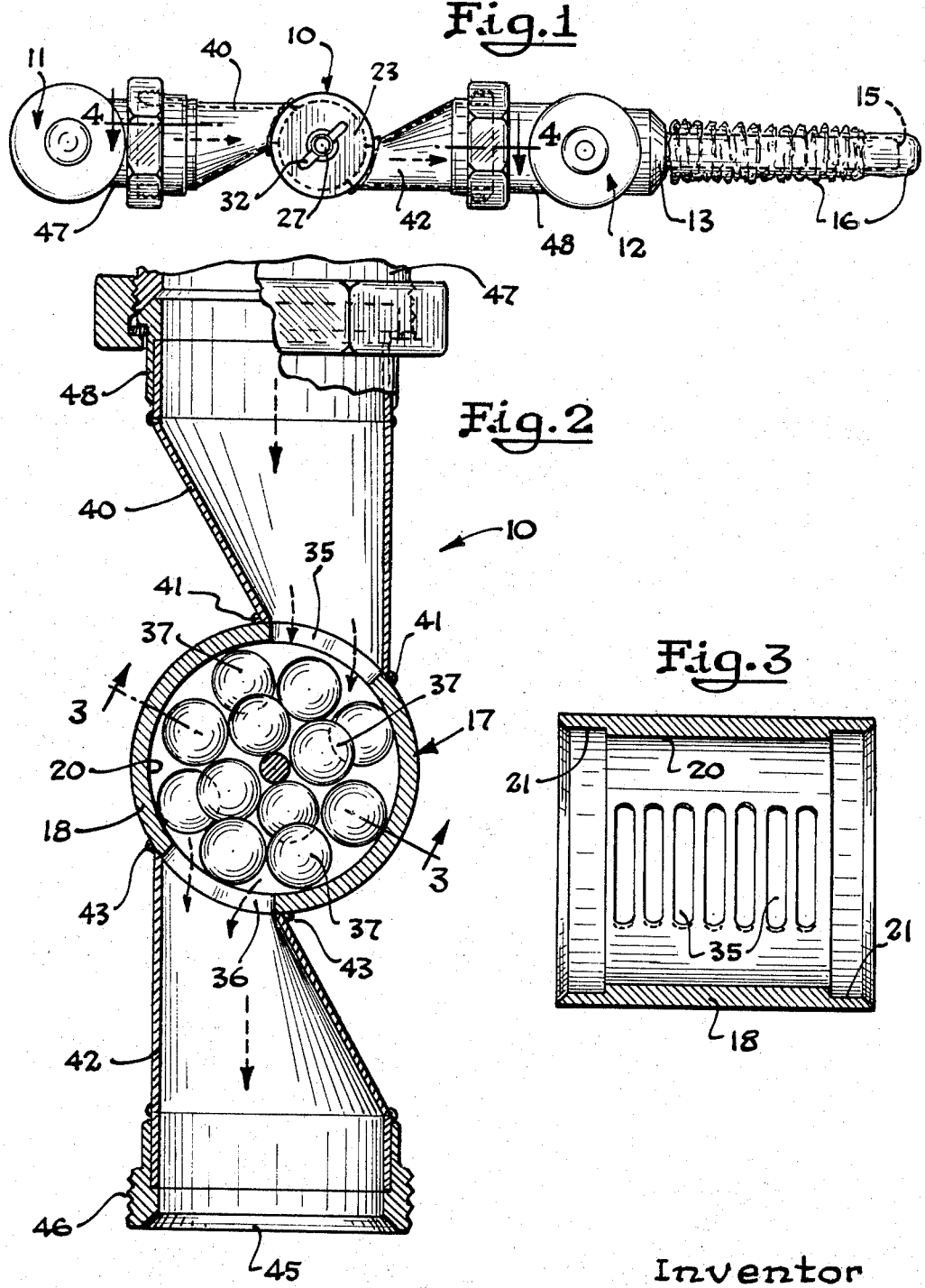

Inventor
Jaraslov L. Svec
By Darbo, Robertson & Vandenburgh
Attorneys

United States Patent Office 3,378,234
Patented Apr. 16, 1968

3,378,234
HOMOGENIZER
Jarslov L. Svec, Chicago, Ill., assignor to St. John & Co., Chicago, Ill., a corporation of Illinois
Filed Nov. 25, 1966, Ser. No. 596,971
7 Claims. (Cl. 259—4)

ABSTRACT OF THE DISCLOSURE

A homogenizer is provided for a sausage stuffing system. The homogenizer comprises a cylindrical body having a cylindrical wall defining void. The body has two open ends transverse to the axis of the cylinder. There are cover plates at each end of the body closing the ends of the cylindrical void. A bolt extends between the cover plates and through one of the cover plates with a wing nut on the outside so that by removing the wing nut the cover plates may be separated and removed. The cylindrical body has openings in the sidewalls. A first duct is secured through the body in communication with the inlet opening and has a coupling at the distal end of the duct. A second duct is affixed to the body in communication with the outlet opening and has a coupling at the distal end thereof.

In one embodiment, the inlet and outlet openings and the respective ducts are positioned at opposite sides of the cylindrical body, the positioning being such that the movement of the sausage emulsion into and out of the cylindrical body through the ducts is generally tangential to the cylinder. The cylinder is filled with a plurality of small solid objects, bolts and nuts being illustrated. The inlet and outlet openings are in the form of grates to retain the small solid objects in the cylindrical body.

In an alternative embodiment, the inlet and outlet openings and the respective ducts are positioned so that the emulsion flows through the cylindrical body in a generally straight path between the inlet and outlet openings. The body has grooves in the inside of the cylindrical walls to receive the three corners of a triangular grating member thus held within the cylindrical body. The grating member has openings of different configurations in the walls thereof. The emulsion is forced to flow in a securitas path within the body by the configuration of the triangular grating member.

---

This invention relates broadly to equipment for use in the stuffing of an emulsified meat product into a tubular skin or casing, and more particularly to a mixer or homogenizer for randomly orienting the meat fiber content within the emulsion immediately before the emulsion enters the casing, and the following disclosure is offered for public dissemination upon the grant of a patent therefor.

In preparing most of the meat products sold in sausage form, the proper proportion of meat, fat, spices, water and other ingredients are mixed together so as to form a fluid of relatively thick consistency. This mixture is then pumped through a stuffing horn and into a casing which is shirred over the stuffing horn. After the casing is filled it is tied off at regular intervals to form a plurality of individual sausage shaped products, and these individualized products are then cooked and smoked preparatory to shipment to market. This heating process solidifies the meat emulsion to the proper hardness so that it retains its form upon removing the casing. In some cases, as with most sausage products, the casing consists of a natural and edible material such as sheep or hog gut, and it is left on the product. With certain other products, such as hot dogs, the casing is stripped from the product after heating and prior to sale. These latter mentioned casings are usually made of artificial materials.

In the present invention there is a final mixing of the emulsion just prior to its being injected into the casing. This final mixing eliminates a problem that plagues the sausage making industry, specifically, the existence of large air pockets in the mix. While any air pockets, and others, are undesirable, the problem of eliminating air altogether is so troublesome and expensive, that most of the industry does not attempt to do so. However, when there is a large air pocket the result is an obvious void or cavity in the finished product which distresses the purchaser. The present invention breaks up any such large air pockets and disperses the air in much smaller bubbles throughout the mix so that after stuffing and cooking, no large voids or cavities exist in the product.

Another well known problem in this art is that of "greasing." This term applied to the accumulation of a slippery film at the surface of the product at the inside wall of the duct or pipe through which the meat emulsion is pumped prior to the stuffing operation. This also tends to result in a less satisfactory product than is desired. Furthermore, stuffing equipment must be torn down periodically for cleaning and inspection by the appropriate inspecting agencies.

Although the meat emulsion is well mixed prior to its being stuffed within the casing, it is known in the art that the flow of emulsion through a tube such as the stuffing horn tends to align the strands of the fibrous material contained therein longitudinally of the tube, this fibrous material principally being the finely divided meat ingredient. The degree of fiber alignment within the tube increases with the length of the tube. Since the meat fibers are the most significant ingredient in holding the solidified product together, the transverse strength of the sausage suffers as a result of this fiber alignment.

This diminished transverse strength is undesirable both to the producer and to the consumer. For example, when removing the casing, the meat product contained therein has a tendency to stick to the casing. When the transverse strength is inadequate, this tendency may result in breaking the product as the casing is removed. This leaves the remaining product with an unsightly appearance. Also, the remaining product may have a tendency to fall apart as a result of its reduced transverse strength.

As will be seen, this invention concerns itself with providing an improved mixer to perform the function of providing a final mixing of the emulsion just prior to its being introduced into the casing to disorient the fibers and eliminate the problem otherwise resulting.

It is a general object of this invention to provide an improved homogenizer or mixer which includes internal mixing elements which are passively driven, yet a thorough mixing is achieved.

It is an extension of the previous object to provide such a mixer or homogenizer which is both compact and of simple construction.

An even further object and an advantage of the present invention is to provide an apparatus which can be readily disassembled for easy cleaning and inspection.

Other objects and advantages will become readily apparent upon a reading of the following description when taken in conjunction with the accompanying drawings, wherein:

FIG. 1 is a partially diagrammatic side view of stuffing equipment showing the general arrangement of parts in such apparatus and including one preferred form of the invention chosen for illustration;

FIG. 2 is a cross sectional view of the homogenizer taken substantially along the lines 2—2 of FIG. 4;

FIG. 3 is a cross sectional view of the outer shell porion of the main mixing body of the homogenizer taken substantially along the lines 3—3 of FIG. 2;

Figure 4:
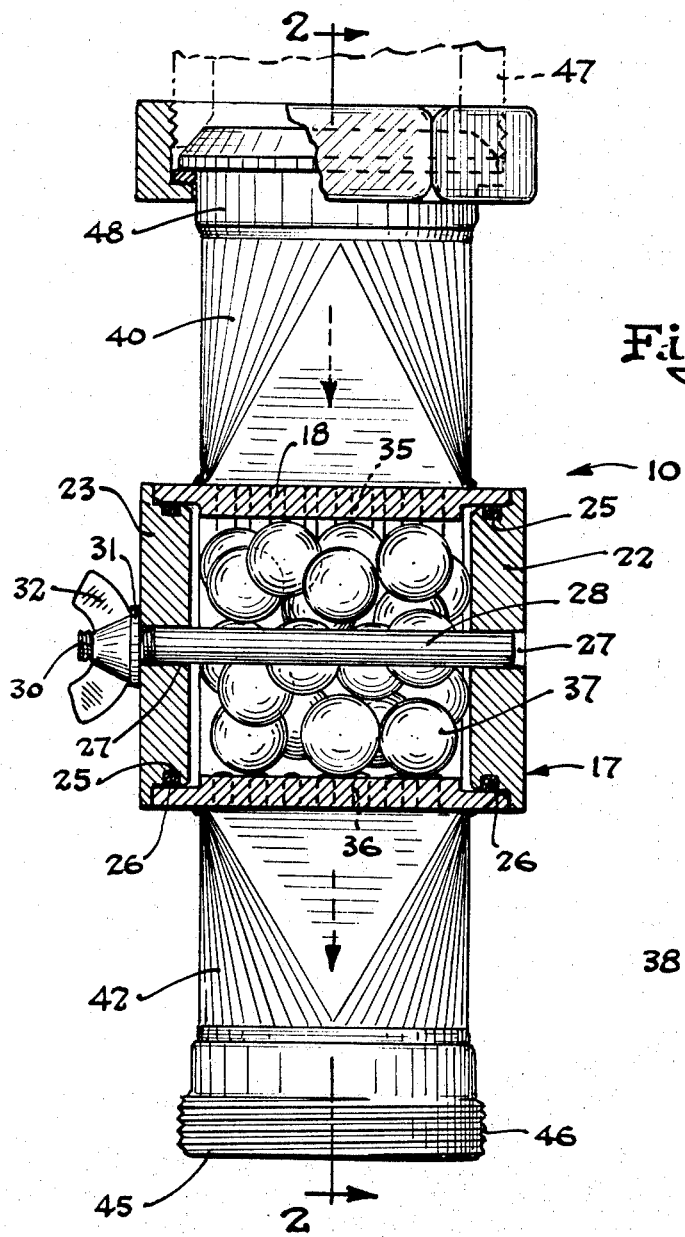
FIG. 4 is a cross sectional view of the homogenizer taken substantially along the lines 4—4 of FIG. 1.

Although the following disclosure offered for public dissemination is detailed to ensure adequacy and aid understanding, this is not intended to prejudice that purpose of a patent which is to cover each new inventive concept therein no matter how others may later disguise it by variations in form or further improvements. The claims at the end hereof are intended as the chief aid toward this purpose; as it is these that meet the requirements of pointing out the parts, improvements, or combinations in which the inventive concepts are found.

Referring now to the drawings, and in particular to FIG. 1, the homogenizer shown generally at 10 is shown as an integral part of stuffing equipment which also includes a pump 11, a valve 12, and a stuffing horn 13. Stuffing horn 13 includes an outwardly extending and open ended tube 15 over which is a casing 16 into which the meat emulsion is stuffed. The casing is shirred, i.e. gathered into folds. Pump 11 provides the power for the stuffing operation, and valve 12 starts and stops the flow of meat emulsion. Although valve 12 is shown positioned on the stuffing side of the homogenizer, it could also be placed on the pump side. Also, it will be understood that there may be a supply means (not shown) that supplies the meat emulsion to the pump 11.

Homogenizer 10 includes a main mixing body, generally 17, of generally hollow cylindrical shape. Mixing body 17 is formed in part by a hollow cylindrical shell 18 having an inner cylindrically shaped side wall 20 undercut as at 21 at each longitudinal end for receiving one of a pair of disc shaped end plates 22 and 23 therein. Together, shell 18 and end plates 22 and 23 form an internal void or enclosure of cylindrical shape. Each of the end plates 22 and 23 has a groove 25 in which is carried an O-ring 26 for sealing the end plate with shell 18. End plates 22 and 23 each have a central hole 27 drilled axially therethrough which are in axial alignment with one another. One end of an elongate rod 28 is carried in hole 27 of end plate 22 and welded thereto. The other end is threaded as at 30 and extends through hole 27 of the end plate 23 to permit a sealing washer 31 and thumb screw 32 to be drawn up tightly thereon to thereby lock the end plates both together and to cylindrical shell 18.

Means are provided for permitting access into the void defined by mixing body 17, and herein these means comprise a plurality of inlet openings in the form of elongated and parallel holes 35. Similarly, means are provided for providing an outlet from said void. These means comprise a similar set of openings or holes 36. Holes 35 and holes 36 are positioned diametrically opposed from one another in side wall 20.

Figure 5:
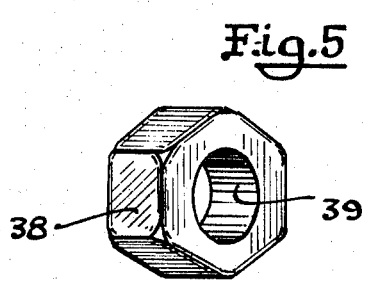
FIG. 5 is an alternate form for the objects contained within the main mixing body.
Figure 6:
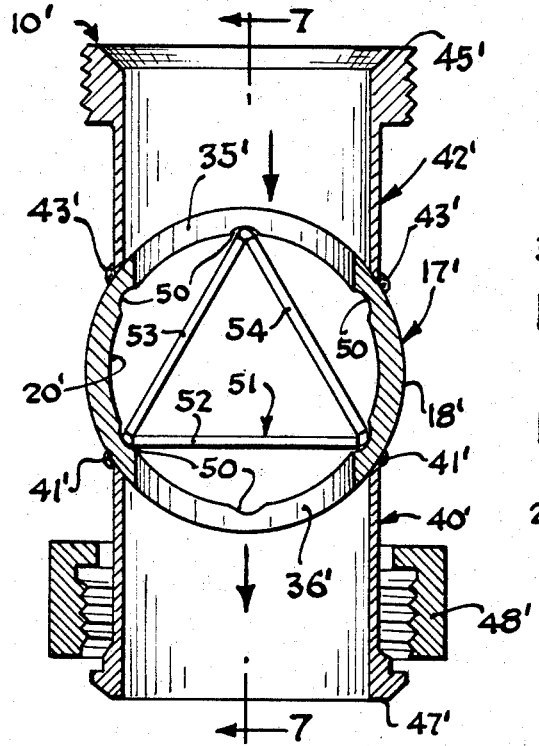
FIG. 6 is a longitudinal cross sectional view of a modified form of homogenizer in accordance with the present invention.
Figure 7:
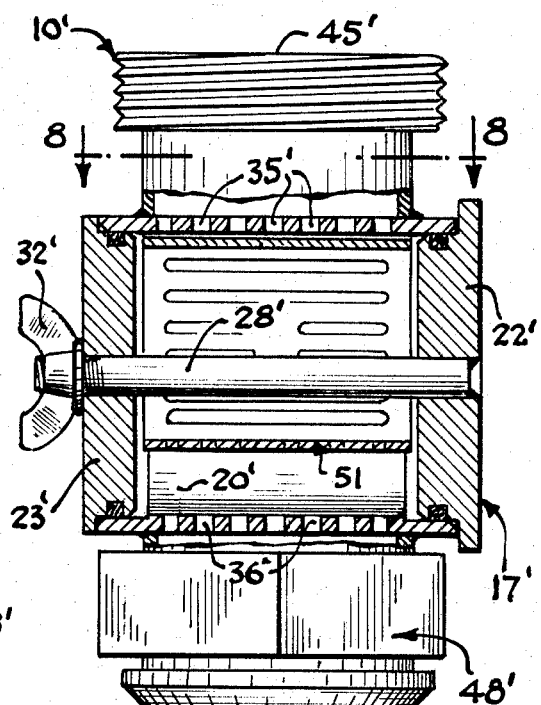
FIG. 7 is a cross sectional view of the form shown in FIG. 6 taken substantially along the lines 7—7 of FIG. 6.
Figure 8:
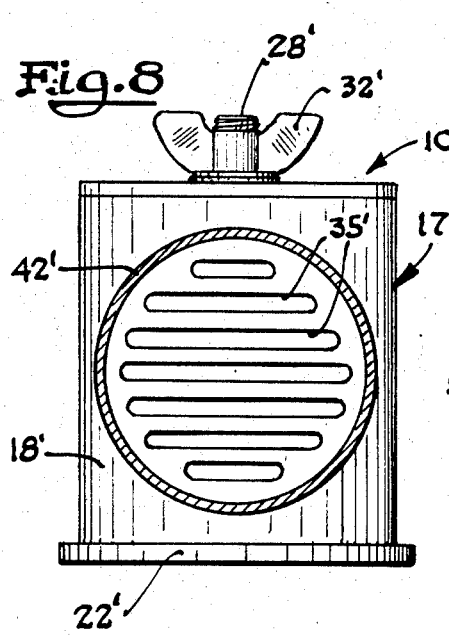
FIG. 8 is a cross sectional view of the modified form of homogenizer shown in FIGS. 6 and 7, this view taken substantially along the lines 8—8 of FIG. 7.
Figure 9:
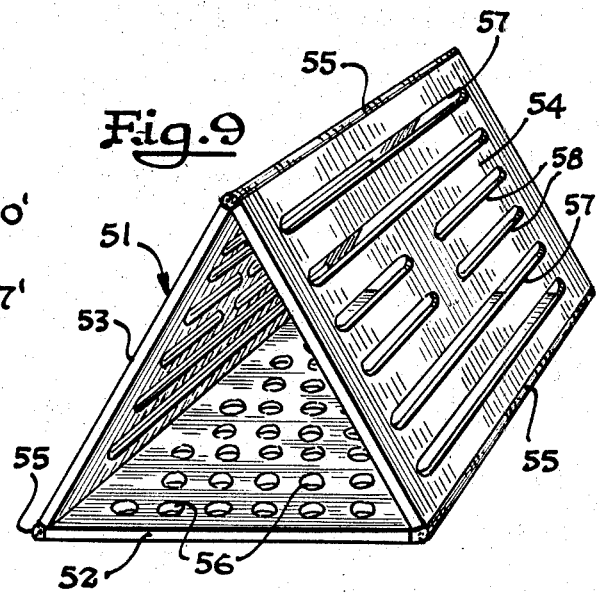
FIG. 9 is a perspective view of the internal mixing member carried within the main mixing body of the modified homogenizer shown in FIGS. 6–8.

Carried inside of the void created by shell 18 and end plates 22 and 23 are means facilitating the mixing of the meat emulsion preparatory to stuffing. Herein these means comprise a plurality of solid objects, preferably of stainless material, which are each sufficiently large to prevent their escape through openings 35 and 36. While the objects 37 are shown as spherical in FIGS. 2 and 4, they can be of generally any shape. FIG. 5 shows one such alternate shape, this being the shape of an ordinary machine nut, but lacking internal threads in the central opening 39 which threads would be difficult to clean. Preferably, the internal void of mixing body 17 is loosely filled with objects 37 to permit free movement thereof under the influence of the passing meat emulsion.

Homogenizer 10 also includes inlet means for the mixing body which are in the form of a duct 40 that converges in the direction of flow. Duct 40 is welded to mixing body 17 around inlet holes 35 as at 41. The shape of inlet duct 40 is such that the inflow of material into mixing body 17 enters in a direction generally tangential to inner surface 20.

Outlet means for permitting the outflow of material from mixing body 17, so as to channel the material to the stuffing horn, is provided in the form of an outlet duct 42. Outlet duct 42 is welded to the mixing body around outlet openings 36 as at 43, and diverges outwardly and tangentially therefrom to an outermost end 45 which is circular in cross section and which carries appropriate fittings as at 46 to adapt it for connection with the stuffing horn. Similarly, the outermost end 47 of inlet duct 40 is circularly shaped and carries a similar fitting 48 to adapt it for connection with pump 11. It will be noted from the drawing that the portions of inlet duct 40 and outlet duct 42 where they connect to mixing body 17 has a smaller internal cross sectional area than the cross sectional area of the ducts where they connect to pipes 47 and 48.

In operation, and assuming valve 12 is open, pump 11 pumps the meat emulsion through converging duct 40. The meat emulsion passes into the void within mixing body 17 through openings 35 in a direction generally tangential of the inner side wall 20. This flow of material into the mixing body causes the solid objects 37 contained therein to move about relatively freely in a generally clockwise sense as viewed in FIGS. 1 and 2. This movement is entirely passive inasmuch as it is caused by the flow of emulsion therethrough rather than being induced by some other externally applied force. As will be understood, the paths which the emulsion follows through and around the objects 37 in the mixer are continuously changing; and therefore, no regular flow patterns are set up which might defeat a thorough mixing of the emulsion. These paths will have portions in common with other paths and will have separate constricted portions where separate paths are defined between adjacent objects or between the objects and the walls. With objects such as illustrated in FIG. 5, separate paths are defined through the central opening in the object.

The thoroughly mixed meat emulsion is discharged from mixing body 17 through holes 36 and passes very shortly thereafter into the shirred casing 16. The size of openings 35 and 36 is designed to prevent the escape of objects 37 out of the mixing body 17. Periodically, valve 12 is turned off so that the filled casing 16 can be tied off and cut and removed. A new shirred casing is then fitted over the stuffing horn.

As can be seen, a thorough mixing of the meat emulsion is achieved in an extremely small volume containing passive mixing means. Also, the continuously changing routes of the emulsion through the mixing body prevents the establishment of a definite pattern of the fiber orientation within the emulsion. Furthermore, an inherent wiping action is set up between the parts of the mixer which diminishes the adverse effects of greasing. An even further desirable feature resides in the simplicity of construction whereby the homogenizer can be quickly disassembled for periodic cleaning and inspection.

In the modified form of homogenizer shown in FIGS. 6–9, similar parts being designated with like numbers primed, the homogenizer is shown here generally as 10' and includes a main mixing body 17' of a shape substantially the same as that of main mixing body 17 of the earlier described embodiment. Mixing body 17' includes a cylindrical shell portion 18' which has inlet and outlet opening means or holes 35' and 36', respectively, of slightly different shape and positioning than those in mixing body 17. Shell 18' further includes a plurality of six internal and arcuate grooves 50 equally spaced around inner sidewall 20'. These grooves 50 extend longitudinally through cylindrical shell 18' and parallel its central axis to thereby slidably receive and rotatably secure internal mixing means 51.

Internal mixing means 51 comprises a member constructed of three rectangular sheets or plates 52, 53 and 54 forming side walls of preferably stainless material welded together as at 55 to rigidly connect them to one another. As welded, mixing means 51 has an overall outer shape resembling a triangular wedge or prism. Plate 52 has drilled therein a plurality of holes 56, and plates 53 and 54 contain a plurality of slots extending parallel with the axis of mixer 51. Some of these slots are relatively long, as at 57, while others are considerably shorter, as at 58.

Although internal mixing means 51 can be inserted within cylindrical shell 18' in any one of a number of different angular orientations, this being because of the surplus of grooves 50, the most effective orientation is that shown in the drawings. In this position, the outer surface of plate 52 faces slots 35' so as to provide a transverse apertured or perforated barrier to the emulsified means product flowing out of main mixing body 17' to outlet slots 36'. It will be noted that slots 57 and 58 in plates 53 and 54 extend transversely of the flow of emulsion through main mixing body 17'.

Main mixing body 17' also includes cover plates 22' and 23' of similar shape as the corresponding parts in the earlier described embodiment, and these plates are similarly drawn together to close and seal off each axial end of cylindrical shell 18' by means of end threaded rod 28' and thumb 32'. The axial length of internal mixing means 51 is substantially the same as the distance between cover plates 22' and 23' (when mounted) to ensure that substantially all the meat emulsion is forced to pass entirely through internal mixing means 51 during operation.

Homogenizer 10' also includes an inlet duct 40' of generally cylindrical shape welded to cylindrical shell 18' as at 41', and also includes a cylindrical outlet duct 42' welded to cylindrical shell 18' as at 43'. Outermost end 45' of the outlet duct is threaded to adapt that end of the homogenizer for connection with the stuffing horn, and outermost end 47' of the inlet duct carrier a fitting 48' to adapt it for connection with pump 11.

In operation, pump 11 pumps the meat emulsion through duct 40' and into main mixing body 17' via inlet slots 35'. Slots 35' provide an initial mixing as the emulsion passes therethrough. The emulsion then passes through holes 56 of internal mixing means 51 and thereby receives a second mixing as it passes into the internal void of internal mixer 51 as formed by plates 52, 53 and 54. From there the emulsion passes out of the internal void of mixing means 51 via elongate slots 57 and 58 in plates 53 and 54. In passing through these slots, the already partially mixed emulsion is divided into layers which overlap one another in a new configuration from that which previously existed. From there the material passes out of main mixing body 17' via outlet slots 36', oriented transverse of slots 57 and 58, to give a final mix to the meat emulsion.

It will be appreciated that some of the advantages attributed to the earlier described embodiment also pertain to the latter described homogenizer form. In addition thereto, this latter form of homogenizer can be seen to have the advantage of incorporating internal mixing means in the form of a single object which thereby further simplifies removal and reinsertion thereof to facilitate cleaning.

I claim:

1. Apparatus for homogeneously mixing a meat emulsion immediately prior to stuffing it into a casing and adapted to be connected to the pipes leading to a pump and to a stuffing horn respectively, said apparatus comprising: a cylindrical body defining a cylindrical void, said body having an inlet opening in one side thereof and an outlet opening in another side thereof spaced from the inlet opening; cover plates at each end of the body and defining the ends of said void; means releasably affixing said plates to said body; a first duct affixed to said body, communicating with said inlet opening and adapted to be connected to the pump pipe; a second duct affixed to said body, communicating with said outlet opening and adapted to be connected to said stuffing horn pipe; and means in said void and defining a plurality of paths from said inlet opening to said outlet opening, said paths having portions in common with other paths and separate portions of constricted cross sectional size.

2. Apparatus as set forth in claim 1, wherein said ducts are of reduced cross sectional size at said openings and larger cross sectional size where they connect to the respective pipes.

3. The apparatus as set forth in claim 1, wherein the means in said void comprises a plurality of individual and solid objects.

4. The apparatus as set forth in claim 1, wherein the means in said void comprises a single rigid member having a plurality of perforated side walls lying generally transverse of the flow of emulsion through said void, said member substantially filling said void to constrain substantially all of said emulsion to flow therethrough.

5. The apparatus as set forth in claim 4, wherein said member has three side walls, said walls being connected together to form an open ended triangular member, said body including longitudinal grooves in its internal side wall for slidably receiving said member.

6. The apparatus as set forth in claim 5, wherein the perforations in at least one of the sidewalls of the member comprise slots having generally one orientation with respect to the longitudinal axis of the cylinder, and wherein said wall of the body at said inlet and outlet openings defines slots which are oriented with respect to said axis approximately 90 degrees from the orientation of the member slots with respect to said axis.

7. The apparatus as set forth in claim 1, wherein the inlet and outlet openings and the respective ducts are so positioned on the cylindrical body that the emulsion moving into and out of the void moves substantially tangentially with respect to the cylindrical void.

References Cited

UNITED STATES PATENTS

| | | | |
|---|---|---|---|
| 2,583,206 | 1/1952 | Borck et al. | 259—4 |
| 2,584,827 | 2/1952 | Bailey | 259—4 |
| 2,815,532 | 12/1957 | Braulich | 259—4 X |

FOREIGN PATENTS 742,209  12/1932  France.

ROBERT W. JENKINS, *Primary Examiner.*